Oct. 11, 1955     C. W. BRANDON     2,720,181
BARGE TRIM ADJUSTMENT FOR CONFINED FLUIDS
Original Filed April 7, 1949     4 Sheets-Sheet 1
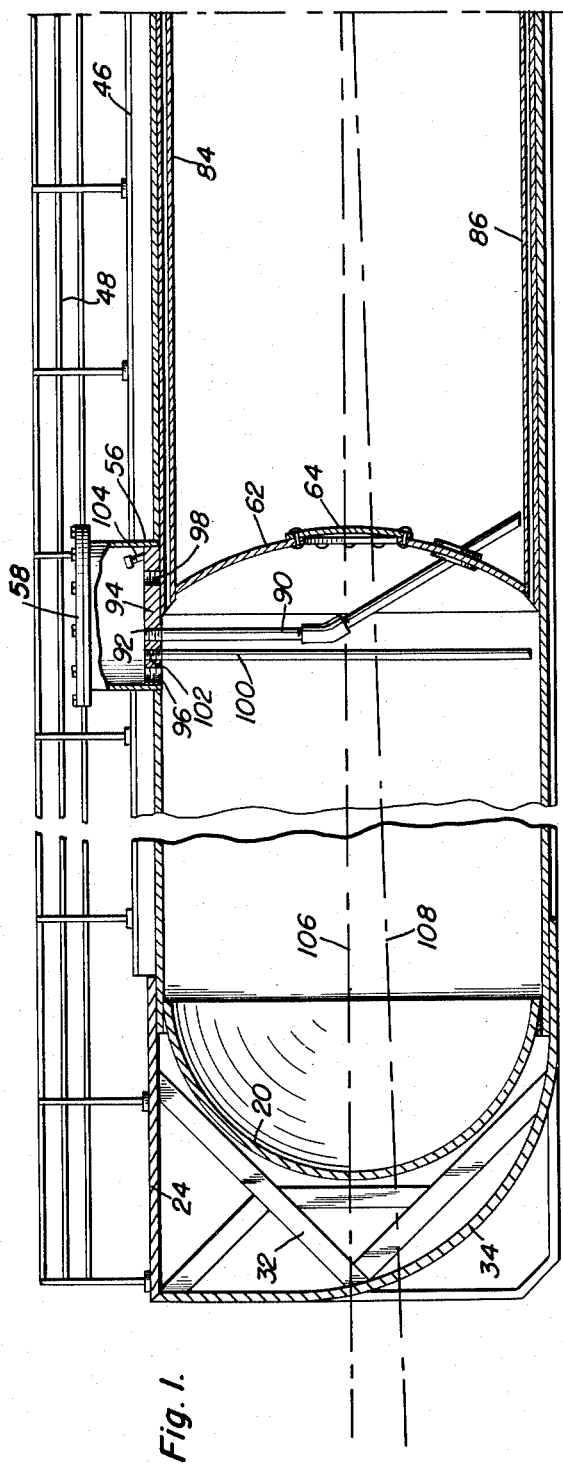
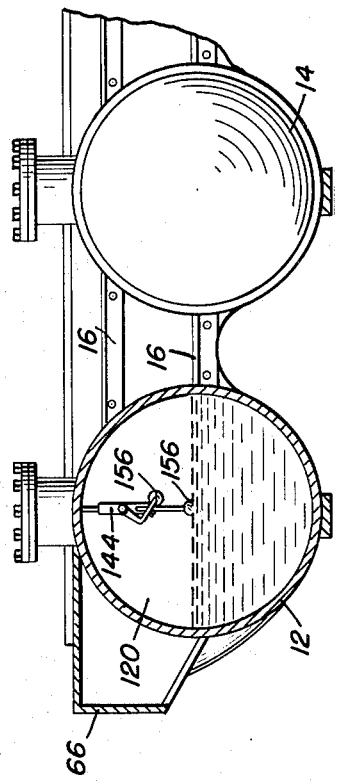
Clarence W. Brandon
INVENTOR.

Oct. 11, 1955     C. W. BRANDON     2,720,181
BARGE TRIM ADJUSTMENT FOR CONFINED FLUIDS
Original Filed April 7, 1949     4 Sheets-Sheet 2

Clarence W. Brandon
INVENTOR.

BY *Clarence A. O'Brien*
*and Harvey B. Jacobson*
Attorneys

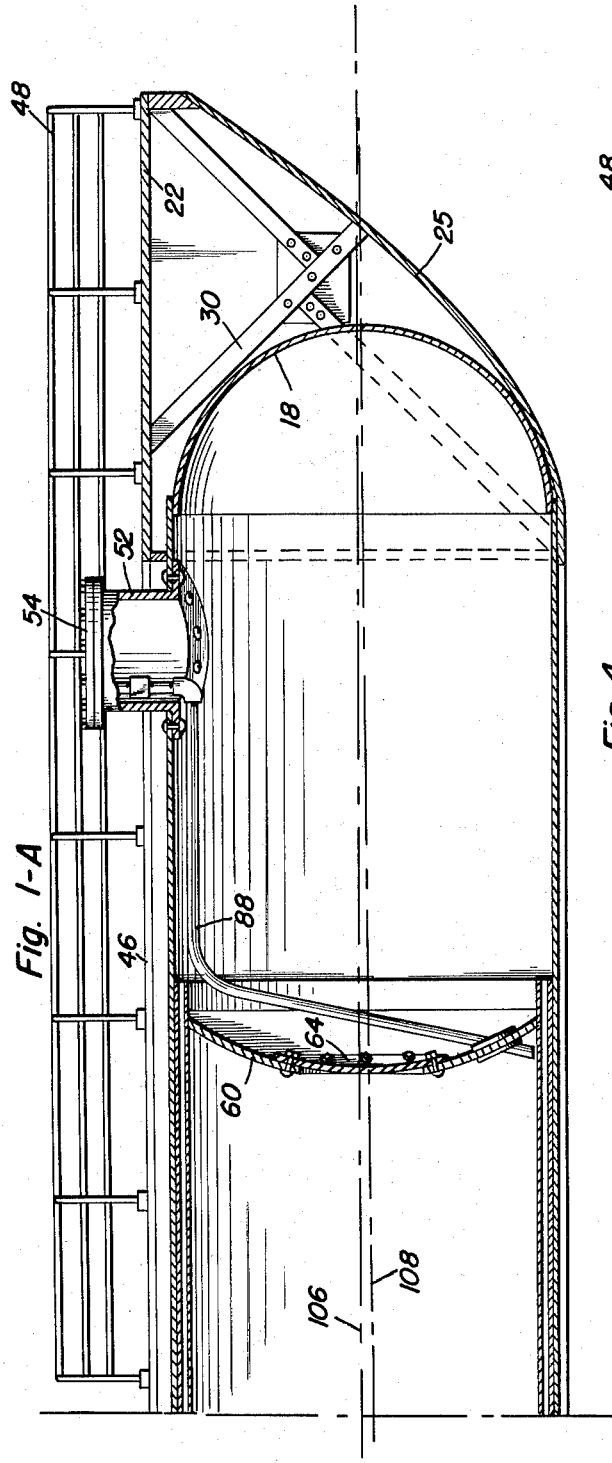
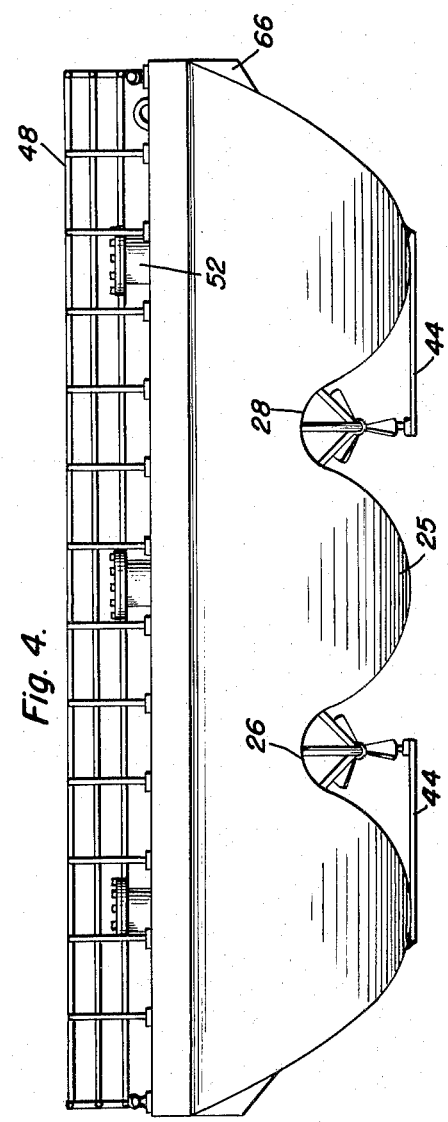
Clarence W. Brandon
INVENTOR.

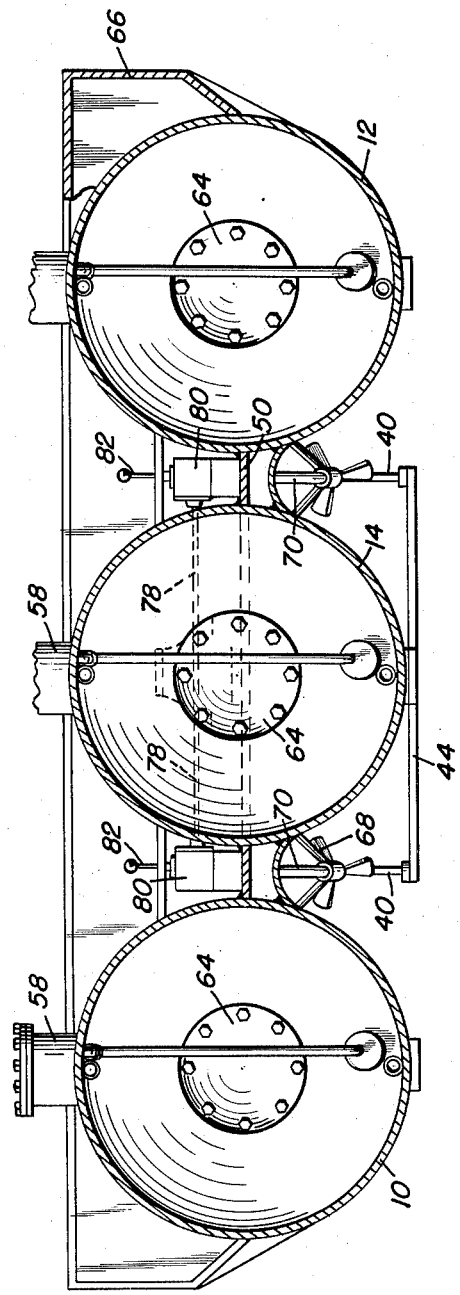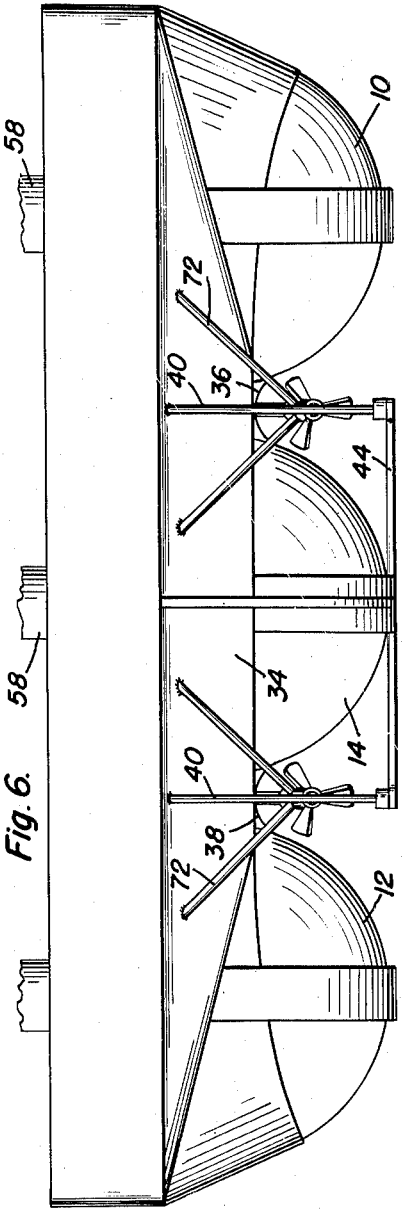
Clarence W. Brandon
INVENTOR.

United States Patent Office 2,720,181
Patented Oct. 11, 1955

2,720,181

BARGE TRIM ADJUSTMENT FOR CONFINED FLUIDS

Clarence W. Brandon, Tallahassee, Fla., assignor, by direct and mesne assignments, of forty-two and one-half per cent to said Brandon, fourteen and one-sixth per cent to N. A. Hardin, fourteen and one-sixth per cent to Hazel H. Wright, and fourteen and one-sixth per cent to Catherine H. Newton, all of Forsyth, Ga., and fifteen per cent to Harvey B. Jacobson, Washington, D. C.

Original application April 7, 1949, Serial No. 86,032. Divided and this application March 20, 1951, Serial No. 216,544

10 Claims. (Cl. 114—74)

This invention comprises novel and useful improvements in a multiple unit, self-trimming barge for volatile liquids, and in general comprehends apparatuses and methods for the storage, cooling and transportation of volatile liquids and other fluids. More specifically, it comprises a plurality of tanks rigidly secured together with prow and stern assemblies to form a barge, which tanks are each internally subdivided into a plurality of compartments together with suitable fluid connections between the various compartments within each tank for maintaining the trim of the barge during and to facilitate loading and unloading.

This application is a division of my copending application, Serial No. 86,032, filed April 7, 1949, for Multiple Unit Self-Trimming Barge for Volatile Liquids, which copending application in turn contains subject matter which is similar to that set forth in a prior patent of Clarence W. Brandon and George M. Brandon, No. 2,408,505, my copending application, Serial No. 39,154, filed July 16, 1948, and patented September 21, 1954, and my copending application, Serial No. 74,546, filed February 4, 1949, and it further includes improvements over said prior patent and copending applications.

As set forth in detail in my above referred to copending applications, the industry of storing and transporting liquefied volatile fluids, particularly such as ammonia, butane, and propane, has long recognized that the basic difficulties to be overcome arise from the necessity of maintaining the confined volatile fluids at a sufficiently low temperature to prevent their absorption of heat and concomitant internal temperature and pressure rises, with the mechanical problems associated therewith.

A prime feature of this invention comprehends the provision of a shallow draft and seaworthy barge having a plurality of compartmented tanks whereby varying quantities of liquid may be loaded or discharged without deleteriously altering the navigational trim of the barge and without detrimentally affecting the efficient storage of the volatile liquid cargo of the barge.

An additional feature of the invention consists in providing one or more partitions in each of the tanks to divide the same into two or more storage compartments, whereby each tank will be provided with a liquid storage compartment and a combined liquid and vapor receiving compartment, which latter admits of expansion and contraction of the liquid contents of the barge while retaining all of the volatile vapors of the confined volatile liquid.

These, together with various ancillary features and objects of the invention which will later become apparent as the following description proceeds, are attained by the present invention, preferred embodiments of which have been illustrated by way of example only in the accompanying drawings, wherein:

Figures 1 and 1A are, respectively, stern and prow portions of a vertical, central longitudinal sectional view through an embodiment of a barge tank constructed in accordance with this invention;

Figure 4 is a front elevational view, parts being broken away, of the improved barge;

Figure 5 is a vertical transverse sectional view, parts being broken away, of the improved barge;

Figure 6 is a stern elevational view, parts being broken away of the improved barge; and, Figure 7 is an end elevational view, parts being shown in vertical transverse sectional view of the improved barge.

Reference is now made more particularly to the accompanying drawings, showing a suitable embodiment of the invention and wherein like numerals designate similar parts throughout the various views.

I.—*Hull construction*

While the above identified copending applications disclose barges for transporting volatile liquids, which barges consist of two or more separate tanks rigidly attached together, the present invention relates to further specific constructions of the individual tanks and novel means for rigidly connecting and associating the same. An essential principle of the embodiment disclosed herein is that the barge tanks are so compartmented and interconnected that varying quantities of the liquid cargo may be loaded or withdrawn as required without deleteriously affecting the navigational trim of the bargo.

The principles of this invention, in accordance with the present application, have been illustrated for convenience and simplicity of explanation as applied to a barge formed of three spaced and substantially parallel tanks. As will be readily apparent from a consideration of the principles of the invention as set forth in the following description, any suitable number of tanks may be employed in accordance with the overall capacity of the barge which is desired. Moreover, these tanks may be disposed in varying arrangements in accordance with the particular use to which the device is to be put.

Figure 2:
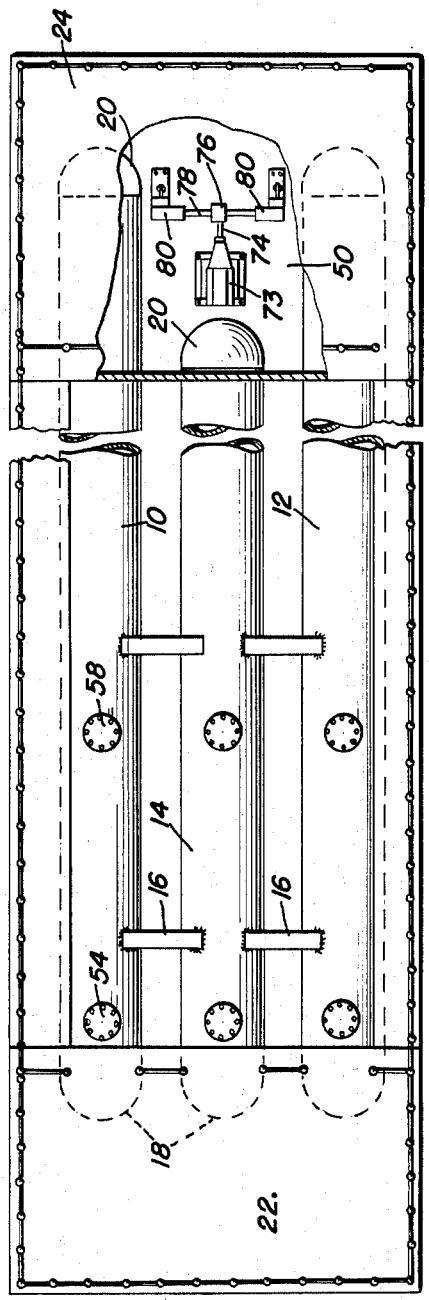
Figure 2 is a top plan view, parts being broken away, of a barge which may be formed from the tank embodiment of Figures 1 and 1A, in accordance with this invention.

Referring now first to Figure 2, and in conjunction with Figure 7, the embodiment of barge illustrated will be found to consist of a pair of outside tanks 10 and 12 which are preferably of identical construction and dimensions, rigidly attached to an intermediate tank 14 as by suitable bracing struts or the like 16. It is preferred to form the intermediate tank of a different length than the outside tanks, so that the front ends of the series of tanks may be coextensive or lie in the same transverse vertical plane, but the rear end of the intermediate tank will terminate forwardly of the rear ends of the outside tanks to provide a space therebetween which is utilized for purposes hereinafter set forth.

Of course, the intermediate tank could be of the same length as the outside tanks if desired, and its forward end and rear end could both be disposed in advance of the corresponding ends of the outside tanks. In addition, while in the simplest embodiment the intermediate tank is of the same diameter as the outside tanks, and has its upper and lower surface disposed in the same horizontal planes as the corresponding surfaces of the outside tanks, it will be readily apparent that it is possible to form the inner tank of a diameter either greater than or less than the outside tanks.

The tank units of the hull of the barge, as will be clearly apparent from Figures 1 and 1A, are provided with hemispherical or convexed forward and rear ends 18 and 20, respectively, in order to better adapt the tanks to withstand the internal pressures developed by their liquid cargo, and in particular the widely varying and extreme pressures developed by such volatile liquid cargoes as propane, butane, ammonia, and the like.

In a similar manner to that disclosed in my above identified copending applications, prow and stern assemblies are secured to and mounted upon the forward and rearward ends of the hull tank units. The prow and stern assemblies include horizontally extending deck plates 22 and 24, respectively, see Figures 1A and 1, respectively, which extend across the entire series of tank units and are rigidly attached thereto as by welding or the like.

These deck plates 22 and 24 extend beyond the ends and laterally of the tank units, as will be seen in Figure 2. The prow assembly includes a bottom wall 25 which slants downwardly and backwardly from its forwardmost edge to be joined and secured to the forward end of the tank units. As will be seen by reference to Figure 4, the forward lower edge of the prow assembly is scalloped at its lower edge to provide a contour corresponding to the cross-sectional contour of the assembled tank units of the barge, thus defining openings 26 and 28 which constitute the forward ends of tunnels which extend between the tank units the full length of the barge and perform the functions of keels as well as propeller receiving tunnels as set forth in detail in my copending application, Serial No. 74,546, and as referred to hereinafter.

Suitable bracing, as indicated at 30, is provided for giving the necessary rigidity to the prow assembly, similar bracing 32 being employed in the stern assembly. The stern assembly includes a downwardly and forwardly extending end and bottom wall and plate 34 which is likewise rigidly secured, as by welding, to the rear ends of the tank units, the stern assembly, as shown in Figure 6, being similarly provided with scalloped portions 36 and 38 forming the rear or exit ends of the longitudinally extending tunnels with which the prow portions 28 and 26 are respectively associated.

Rudder posts 40 are suitably mounted in the stern assemblies and extend downwardly through each of the longitudinally extending tunnels and have mounted thereon for movement in said tunnels, rudders 42, the rudder posts being controlled with any suitable and known mechanism, not shown. As will be seen, the lower ends of the rudder posts 40 are supported upon suitable plates 44 secured to the bottom surfaces of the tanks.

Although the same is not absolutely essential, it is preferred to provide a complete deck structure 46 suitably supported upon and mounted above the tank units and connecting the prow and stern deck plates 22 and 24. Hand or guard rails 48 will preferably be mounted upon the deck structure 46 about the periphery thereof.

Figure 3:
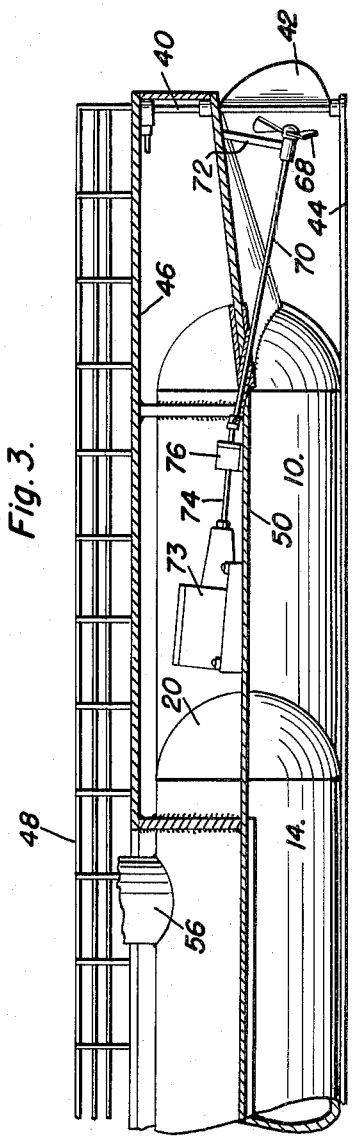
Figure 3 is a fragmentary vertical longitudinal sectional view through the embodiment of Figure 2, and illustrates in particular, the arrangement of the power plant, the stern assembly and one of the driving propellers of the barge.

As will be best seen by reference to Figures 2 and 3, a horizontally disposed plate 50 is provided between the rear ends of the two outside and the intermediate tanks and is rigidly secured to the surfaces of these tanks at substantially the vertical mid-point thereof, this plate being appropriately positioned for connection with the bottom plate 34 of the stern assembly. The plate 50 provides a deck or support which may be conveniently employed for mounting the propulsion engines, the power plant, cabins, storage rooms, and the like, for the barge.

Preferably adjacent its forward end, each of the tank units is provided with a control hatch 52, having covers 54 by means of which access may be had to the interior of the tank unit for inspection, servicing or repairs.

Preferably adjacent the rear ends of the tanks, additional hatches 56 having removable covers 58 are provided for obtaining access to various valves, gauges, liquid and vapor conduits and the like with which the tank units are provided, as set forth hereinafter.

In the embodiment shown in Figures 1 and 1A, each of the tank units is divided by forward and rearward partition members 60 and 62 into an intermediate chamber and a pair of end chambers. These partition plates are preferably curved or dished in order to withstand the variation in pressure to which they are subjected, as well as to permit expansion and contraction of the metal plates forming the tank units, and are conveniently provided with removable manhole covers 64 by means of which workmen entering the forward compartment or chamber through the hatch 52 may obtain access to the intermediate and to the rear chamber of the tank unit.

As in my preceding copending applications, sponsons or blisters may be provided upon the side surfaces of the tanks for imparting buoyancy thereto, increasing stability and the like; and, similarly, lateral fenders 66 may also be employed.

A propeller 68, carried by a propeller shaft 70 supported by a propeller shaft hanger 72, is positioned in each of the longitudinally extending tunnels inwardly of the rudders 42, the shaft 70 extending through suitable stuffing boxes, not shown, through the bottom wall 34 of the stern assembly and to the space above the horizontal deck 50. These shafts 70 are connected to a power plant of any desired character, such as that indicated at 73, which is mounted upon the deck plate 50, as shown best in Figures 2 and 3. The power plant 73 is provided with a driving shaft 74 which extends into a gear box 76 to drive laterally extending power shafts 78 which, in turn, enter gear boxes 80, see Figure 5, in which they are connected with the propeller shafts 70. The gear casings 80 are provided with manual control levers 82 by means of which the individual propeller shafts may be selectively disconnected from the driving shafts 78, or operated in relatively reverse directions in order to facilitate the steering and maneuvering of the barge when negotiating the restricted channels of inland waterways, canals, or the like.

II.—Tank compartmental construction

Reference is now made more particularly to the arrangement of Figures 1 and 1A. The upper and lower portions of the forward and rearward compartments are placed in free and continuous communication by means of vapor and liquid equalizing conduits 84 and 86, respectively, which extend through the partitions 60 and 62 so that the front and rear compartments perform functionally as a single chamber.

A conduit 88 is positioned in the forward compartment and has its upper end terminating within the hatch 52 which, being at the highest point of the forward compartment and of the barge, constitutes a vapor collecting chamber therein, while the lower end of the conduit 88 extends through the partition member 60 adjacent its lower end and opens into the interior of the intermediate chamber closely adjacent to the bottom thereof.

A conduit 90 whose lower end extends through the partition 62 into the intermediate tank adjacent the lowermost portion thereof is connected at its upper end, as by means of screw threads, with a bore 92 extending through a bottom or closure plate 94 for the hatch 56. A pair of screw-threaded bores 96 and 98 extend through the plate 94 to connect the interior of the hatch 56 with the rear compartment and with the intermediate compartment, respectively. A further conduit 100 screwthreadedly engages a bore 102 in the bottom or closure plate 94, and in its lower end communicates with the rear compartment adjacent the lowermost surface thereof. Suitable tubular fittings 104 are provided whereby gauging means may be inserted into the intermediate or the rear compartments for gauging or indicating the liquid levels and/or the liquid contents thereof.

In loading this embodiment, when the tank is substantially empty, the liquid cargo is supplied by means of the hatch 56 to the inlet end of the conduit 100 into the rear compartment, from which, by means of the equalizing conduits 84 and 86, it fills both front and rear compartments equally and at the same rate. When these compartments are filled, continued inflow of liquid passes by conduit 88, following the previously expelled vapor from the front compartment, into the middle compartment. By properly controlling the escape of vapor from the vent 98, any desired vapor may be attained in the intermediate tank, it being understood that the incoming liquid compresses the vapor in the space above the same, whereby the intermediate tank functions as a combined vapor and liquid pressure storage and expansion chamber. When it is desired to discharge all or a major part of the contents of a tank, the foregoing operation is reversed. The valve means, not shown, controlling the upper end of the conduit 100 is opened whereby the pressure maintained upon the liquid cargo discharges the fluid from the system of compartments. Additional vapor is forced in through the vent 98 to maintain this pressure.

By means of the conduit 90, liquid may also be directly supplied to and withdrawn from the intermediate tank, any necessary vapor pressure adjustment being effected through the vent 98. During this operation, it is preferred to maintain the end compartments completely filled with liquid.

The foregoing arrangement conforms admirably to the requisites for discharging and loading varying partial cargoes. When it is desired to discharge a quantity less than that contained in the middle compartment or to introduce a quantity thereinto, this may be effected by proper control of the conduit 90 and vent 98 without disturbing the contents of the end compartments. If a quantity is to be unloaded greater than that contained in the intermediate compartment, the same will be withdrawn from conduit 100. Thus, fractional parts of the cargo may be removed or added without appreciably varying the trim of the tank.

Moreover, during the loading or unloading operations above mentioned, the lighter ends of the entire cargo which are present in the vapor of the intermediate compartment are retained, thus preventing a loss which is not only expensive but may detrimentally affect the trim and balance of the barge.

It is preferred to fill the front and rear tanks completely with liquid and to maintain them full at all times, while the intermediate tank is partially filled with liquid to varying levels not exceeding a predetermined maximum and constitutes the expansion chamber and vapor chamber for the three tank compartments. By means of suitable control valves, not shown, the various vents may then be closed and the tank unit will then be sealed and ready for navigation. The variations in volume and pressure created by the change in temperatures of the liquid cargo, which variations are especially pronounced in the two completely filled end compartments, are afforded relief by means of the conduit 88, since the solid confined liquids of the front and rear compartments, which are in continuous communication by means of the conduits 84 and 86, may overflow into the intermediate compartment upon expansion of the liquid, and may be returned upon contraction of the same in a manner which will be readily apparent.

It should be particularly noted that by proper manipulation of the vents through their respective valves, that the entire liquid cargo of a tank may be maintained at substantially any desired pressure; and that varying liquid levels may be maintained in the intermediate tank compartment. Further, this arrangement lends itself admirably to the maintaining of separate vapor or expansion spaces in the intermediate compartment and in the two end compartments which operate as a unit by means of their equalizing conduits 84 and 86, if the same is found to be desirable or necessary.

Indicated at 106 is the longitudinal geometric axis or center line of a tank unit when the latter is empty, while the line 108 indicates the position the longitudinal cargo will assume when the barge is fully loaded. The line 106 may coincide with the horizontal plane or, if desired, the barge may be so constructed as to position the line 106 at a slight inclination to the horizontal plane.

A very important advantage of this construction is that various predetermined portions of the liquid cargo of the barge may be discharged without adversely affecting the trim of the barge. Thus, in a three-tank unit barge having nine compartments, it is possible, without detriment to the barge trim, selectively to discharge a part or substantially all of the contents of the intermediate compartment of the middle tank; or the intermediate compartments of the two outside tanks; or the front and rear compartments of either the middle tank or the two outside tanks. This permits a proper balancing of the remaining cargo by appropriately selecting the tank compartments to be all or partially discharged, and the same provision would apply for taking on additional cargoes. Thus, the barge is ideally adapted to make a series of deliveries and take on a series of cargoes during one navigational run or trip, obviously minimizing the cost of handling or operating the barge, all while maintaining the vessel in a seaworthy condition and without impairing its navigability.

In the preceding elucidation, it has been considered that the intermediate compartment constituted the expansion chamber while the two end compartments comprised the liquid storage chambers. Obviously, however, the structure is capable of a reversed arrangement. By making the necessary vapor and liquid connections between the compartments, the middle compartment can constitute the liquid storage chamber while the end compartments will function as the expansion chambers. The operation in the loading and discharging of this reversed arrangement is similar to that set forth above.

Nevertheless, while for practical reasons three compartments are deemed to be generally preferable, it is also entirely feasible to obtain the desideratum of this invention by using tanks having but a single partition and thus forming only two compartments. In this third of the basic embodiments, the partition constructions and associated vapor and liquid connections of the two preceding basic embodiments may be employed. From the purely practical aspect, however, it seems essential in maintaining the requisite buoyancy of the barge to provide the more buoyant expansion and overflow chamber in the front compartment and the liquid storage chamber as the rear compartment.

The proportioning of the tank volume between these two compartments can be widely varied.

It is to be understood that the partitions 60, 62 may be formed of relatively thin, lightweight and inexpensive material compared to that of the tank shell, since the pressures on both sides of each partition are balanced or equalized.

From the foregoing, the apparatus of the invention will now be apparent and further explanation is considered unnecessary. Since numerous changes falling within the spirit of the invention may readily be made, the invention is not to be limited to the exact constructions disclosed herein, but all suitable modifications and equivalents may be resorted to falling within the scope of the appended claims.

Having described the invention, what is claimed as new is:

1. A barge trim adjusting arrangement for storing confined volatile fluids under pressure, comprising a hull consisting of a pair of tanks rigidly connected together in spaced side-by-side relation in a generally horizontal plane, each tank being sealed from the atmosphere for confining a volatile fluid under pressure, at least one of the tanks having a transverse partition therein extending entirely across the tank and providing a liquid storage chamber for receiving a volatile fluid in its liquid phase on one side of the partition and an expansion chamber on the other side of said partition for receiving said fluid in both its vapor and liquid phases, continuously open passage means providing fluid flow and return and extending from adjacent the bottom of said expansion chamber to establish a liquid seal thereat and communicating with said storage chamber adjacent the top thereof, said passage means comprising the sole communication between said chambers, thereby returning liquid only to the storage chamber whereby to control the trim of the barge.

2. A barge trim adjusting arrangement for storing confined volatile fluids under pressure, comprising a hull consisting of a pair of tanks rigidly connected together in spaced side-by-side relation in a generally horizontal plane, each tank being sealed from the atmosphere for confining a volatile fluid under pressure, at least one of the tanks having a pair of longitudinally spaced transverse partitions therein extending entirely across the tank and providing longitudinally spaced chambers, said chambers including a pair of liquid storage chambers for receiving said volatile fluid in its liquid phase and an expansion chamber intermediate said liquid storage chambers for receiving said fluid in both its vapor and liquid phases, continuously open passage means providing fluid flow and return and extending from adjacent the bottom of said expansion chamber to establish a liquid seal thereat and communicating with one of said storage chambers adjacent the top thereof, said passage means comprising the sole communication between the expansion chamber and the storage chambers, thereby returning liquid only to the storage chamber, whereby to control the trim of the barge.

3. A barge trim adjusting arrangement for storing confined volatile fluids under pressure, comprising a hull consisting of a pair of tanks rigidly connected together in spaced side-by-side relation in a generally horizontal plane, each tank being sealed from the atmosphere for confining a volatile fluid under pressure, at least one of the tanks having a pair of longitudinally spaced transverse partitions therein extending entirely across the tank and providing longitudinally spaced chambers, said chambers including a pair of expansion chambers for receiving said fluid in both its vapor and liquid phases and a liquid storage chamber intermediate said expansion chambers for receiving said volatile fluid in its liquid phase, continuously open passage means providing fluid flow and return and extending from adjacent the bottom of one of said expansion chambers to establish a liquid seal thereat and communicating with said storage chamber adjacent the top thereof, said passage means comprising the sole communication between the expansion chamber and the storage chamber, thereby returning liquid only to the storage chamber, whereby to control the trim of the barge.

4. A barge trim adjusting arrangement for storing confined volatile fluids under pressure, comprising a hull consisting of a central tank, a pair of tanks rigidly connected to the opposite sides of the central tank in spaced side-by-side relation, each tank being sealed from the atmosphere for confining a volatile fluid under pressure, each tank of the pair of tanks having a transverse partition therein extending entirely across the tank and providing a liquid storage chamber on one side of the partition for receiving a volatile fluid in its liquid phase and an expansion chamber on the other side of the partition for receiving said volatile fluid in both its vapor and liquid phases, continuously open passage means for each tank of said pair of tanks providing fluid flow and return and extending from adjacent the bottom of said expansion chamber to establish a liquid seal thereat and communicating with said storage chamber adjacent the top thereof, said passage means comprising the sole communication between said chambers, thereby returning liquid only to the storage chamber, whereby to control the trim of the barge.

5. A barge trim adjusting arrangement for storing confined volatile fluids under pressure, comprising a hull consisting of a central tank, a pair of tanks rigidly connected to the opposite sides of the central tank in spaced side-by-side relation, each tank being sealed from the atmosphere for confining a volatile fluid under pressure, each tank of the pair of tanks having a pair of longitudinally spaced transverse partitions therein extending across each tank of said pair of tanks and providing longitudinally spaced chambers therein, the chambers in each tank of said pair of tanks including a pair of liquid storage chambers for receiving said volatile fluid in its liquid phase and an expansion chamber intermediate said liquid storage chamber for receiving said fluid in both its vapor and liquid phases, continuously open passage means for each tank of said pair of tanks providing liquid flow and return and extending from adjacent the bottom of said expansion chamber to establish a liquid seal thereat and communicating with one of said storage chambers adjacent the top thereof, said passage means comprising the sole communication between the expansion chamber and the storage chamber, thereby returning liquid only to the storage chambers, whereby to control the trim of the barge.

6. A barge trim adjusting arrangement for storing confined volatile fluids under pressure, comprising a hull consisting of a central tank, a pair of tanks rigidly connected to the opposite sides of the central tank in spaced side-by-side relation, each tank being sealed from the atmosphere for confining a volatile fluid under pressure, each tank of the pair of tanks having a pair of longitudinally spaced transverse partitions therein extending across each tank of said pair of tanks and providing longitudinally spaced chambers therein, the chambers in each tank of said pair of tanks including a pair of expansion chambers for receiving said fluid in both its vapor and liquid phases and a liquid storage chamber intermediate said expansion chambers for receiving volatile fluid in its liquid phase, continuously open passage means for each tank of said pair of tanks providing liquid flow and return and extending from adjacent the bottom of one of said expansion chambers to establish a liquid seal thereat and communicating with said storage chamber adjacent the top thereof, said passage means comprising the sole communication between the storage chamber and the expansion chamber, thereby returning liquid only to the storage chamber, whereby to control the trim of the barge.

7. The combination of claim 2 including a first conduit connecting the upper portions and a second conduit connecting the lower portions of the storage chambers.

8. The combination of claim 3 including a first conduit connecting the upper portions and a second conduit connecting the lower portions of said expansion chambers.

9. The combination of claim 5 including in each tank of said pair of tanks a first conduit connecting the upper portions and a second conduit connecting the lower portions of the storage chambers.

10. The combination of claim 6 including in each tank of said pair of tanks a first conduit connecting the upper portions and a second conduit connecting the lower portions of said expansion chambers.

(References on following page)

References Cited in the file of this patent

UNITED STATES PATENTS

| | | |
|---|---|---|
| 255,599 | Coppin | Mar. 28, 1882 |
| 1,054,490 | Barnaby | Feb. 25, 1913 |
| 1,140,250 | Cabot | May 18, 1915 |
| 1,358,018 | Kennedy | Nov. 9, 1920 |
| 1,759,644 | Reed-Hill | May 20, 1930 |
| 2,346,505 | Preuss | Apr. 11, 1944 |
| 2,363,177 | Haffner | Nov. 21, 1944 |
| 2,408,505 | Brandon et al. | Oct. 1, 1946 |
| 2,435,332 | Van Vleet et al. | Feb. 3, 1948 |
| 2,487,863 | Garretson | Nov. 15, 1949 |

FOREIGN PATENTS

| | | |
|---|---|---|
| 24,981 | Austria | July 25, 1906 |
| 194,238 | Great Britain | Mar. 8, 1923 |